US010556304B2

(12) United States Patent
Butterworth, III

(10) Patent No.: US 10,556,304 B2
(45) Date of Patent: Feb. 11, 2020

(54) POLYMERIC COVER FOR ROBOTS

(71) Applicant: Butterworth Industries, Inc., Gas City, IN (US)

(72) Inventor: Frank L. Butterworth, III, Upland, IN (US)

(73) Assignee: Butterworth Industries, Inc., Gas City, IN (US)

( * ) Notice: Subject to any disclaimer, the term of this patent is extended or adjusted under 35 U.S.C. 154(b) by 558 days.

(21) Appl. No.: 14/082,511

(22) Filed: Nov. 18, 2013

(65) Prior Publication Data

US 2014/0075733 A1    Mar. 20, 2014

Related U.S. Application Data

(63) Continuation of application No. 11/691,828, filed on Mar. 27, 2007, now Pat. No. 8,585,854.

(51) Int. Cl.
*B29C 65/00* (2006.01)
*B23P 19/04* (2006.01)

(52) U.S. Cl.
CPC ......... *B23P 19/04* (2013.01); *Y10T 29/49826* (2015.01); *Y10T 428/1334* (2015.01); *Y10T 428/169* (2015.01); *Y10T 428/19* (2015.01)

(58) Field of Classification Search
USPC .............. 156/272.6; 901/14; 428/52, 57; 118/326
See application file for complete search history.

(56) References Cited

U.S. PATENT DOCUMENTS 3,051,394 A    8/1962  Sedlacsik
3,279,429 A   10/1966  Tholome et al.
(Continued)

FOREIGN PATENT DOCUMENTS

GB    2200359      8/1988
JP    9-262510     0/1997
(Continued)

OTHER PUBLICATIONS

Patent Board Decision for U.S. Appl. No. 12/056,695, Jun. 12, 2015.*

(Continued)

*Primary Examiner* — Michael N Orlando
*Assistant Examiner* — Elizabeth Bradford
(74) *Attorney, Agent, or Firm* — Fisherbroyles LLP; Keats Quinalty

(57) ABSTRACT

The present invention involves a cover for a spraying device of a robot which is formed from a polymer with enhanced residue retention properties. The polymer may be processed to increase the surface energy of the polymer. For example, the polymer may be subjected to a corona treatment in order to increase its surface energy. The corona treatment process may be performed on the polymer as received, prior to cutting or otherwise manipulating the polymer. Also, the polymer may be embossed to provide the enhancement. To assemble the polymer into a robot cover, the polymer as received may be cut into individual sections for assembly. The sections may then be assembled to one another by heat sealing the sections together. The heat sealing provides a bond between the individual sections of polymer that secures the individual sections together to create the robot cover. The polymer may also be formed into tubular sections for securing to the spraying device.

43 Claims, 1 Drawing Sheet

(56) References Cited

U.S. PATENT DOCUMENTS

| | | | |
|---|---|---|---|
| 3,402,428 | A | 9/1968 | Schreiber |
| 3,408,985 | A | 11/1968 | Sedlacsik |
| 3,554,445 | A | 1/1971 | Engwall |
| 3,606,972 | A | 9/1971 | Ferrant |
| 4,381,533 | A | 4/1983 | Coffee |
| 4,470,550 | A | 9/1984 | Coffee |
| 4,904,514 | A | 2/1990 | Morrison et al. |
| 4,938,522 | A | 7/1990 | Herron et al. |
| 4,973,100 | A | 11/1990 | Yang |
| 5,039,019 | A | 8/1991 | Weinsten et al. |
| 5,112,098 | A | 5/1992 | Lichtmann |
| 5,154,358 | A | 10/1992 | Hartle |
| 5,238,709 | A | 8/1993 | Wilkie |
| 5,845,958 | A | 12/1998 | Rudys et al. |
| 6,082,290 | A | 7/2000 | Conlin |
| 6,086,138 | A | 7/2000 | Xu et al. |
| 6,099,067 | A | 8/2000 | Butterworth |
| 6,346,150 | B1 | 2/2002 | Conlin |
| 6,678,936 | B2 | 1/2004 | Izumi et al. |
| 6,708,908 | B2 | 3/2004 | Heldt et al. |
| D491,964 | S | 6/2004 | D'Andreta |
| 2004/0166298 | A1 | 8/2004 | Chapman et al. |
| 2005/0040262 | A1 | 2/2005 | Nagai |
| 2005/0125248 | A1 | 6/2005 | Butterworth, III et al. |
| 2005/0194474 | A1 | 9/2005 | Sakakibara et al. |
| 2006/0000541 | A1 | 1/2006 | Hager et al. |
| 2006/0124769 | A1 | 6/2006 | D'Andreta |
| 2008/0271669 | A1 | 11/2008 | Butterworth |

FOREIGN PATENT DOCUMENTS

| | | |
|---|---|---|
| JP | 02-298374 | 12/1990 |
| JP | 05318319 | 12/1993 |
| JP | 08-164349 | 6/1996 |
| JP | 09-262507 | 10/1997 |
| JP | 9-267057 | 10/1997 |
| JP | 12140745 | 5/2000 |
| JP | 2001-113207 | 4/2001 |
| JP | 2002-143726 | 5/2002 |
| JP | 2002-186884 | 7/2002 |

OTHER PUBLICATIONS

PCT International Search Report and Written Opinion of International Searching Authority for International Application No. PCT/US2008/058416, dated Aug. 28, 2008, 6 pages.

Markgraf, David A., "Corona Treatment: An Overview", Enercon Industries Corporation, Mar. 8, 2007.

Embossing Technologies, "About the Technology of Embossing", http://www.embossingtechnologies.com/technology.htm, Mar. 8, 2007.

Office Action dated Mar. 11, 2011 for U.S. Appl. No. 12/056,695, 9 pages.

Response to Office Action dated Mar. 11, 2011 for U.S. Appl. No. 12/056,695, 9 pages.

Non-Final Office Action dated Jun. 22, 2011 for U.S Appl. No. 12/056,695, 17 pages.

Response to Non-Final Office Action dated Jun. 22, 2011 for U.S. Appl. No. 12/056,695, 13 pages.

Gao, Yuan, et al., "Mechanical Analysis of Ultrasonic Bonding for Rapid Prototyping", Journal of Manufacturing Science and Engineering, May 2002, vol. 124 pp. 426-434.

Coelho, J.P. et al. "High-Speed Laser Welding of Plastic Films", Optics and Laser in Engineering (2000), pp. 385-395.

Tsujino, Jiromaru et al., "Welding characteristics of 27, 40 and 67 kHz ultrasonic plastic welding systems using fundamental-and higher-resonance frequencies", Science Direct, Ultrasonics 42, (2004), pp. 131-137.

Miller, Carl, "Laser Welding Article", U.S. Laser Corporation, May 1980, 8 pages.

Chan, Chi-Ming, Polymer Surface Modification and Characterization, Chapters 5-7, pp. 193-279, Hansen/Gardner Publication, 1994.

Garbassi et al., Polymer Surfaces: From Physics to Technology, Chapters 6-8, pp. 235-313, John Wiley & Sons Ltd, West Sussex, England, 1998.

E News, Narrow Web Surface Treating Technology, 2.sup.nd Quarter 2002, Enercon Industries Corp., 4 pgs.

Corona discharge, http://en.wikipedia.org/wiki/corona.sub.--discharge, page last modified Aug. 28, 2006, 5 pgs.

Goldman et al., The corona discharge, its properties and specific uses, Pure & Appl. Chem., vol. 57, No. 9, pp. 1353-1362, 1985.

Laser Welding Overview, Engineers Edge Solutions by Design, copyright 2000-2008 by Engineers Edge, 2 pgs.

Paint Facilities, TD Industrial Coverings, Inc., Oct. 6, 2005, 2 pgs.

DuPont. TM. Tyvek.RTM. Users Manual, Legendary Strength + Distinctive Appearance=Outstanding Results, copyright 2004.

Brochure, R.J. Hanlon Company, Inc., no date provided, 13 pgs.

\* cited by examiner

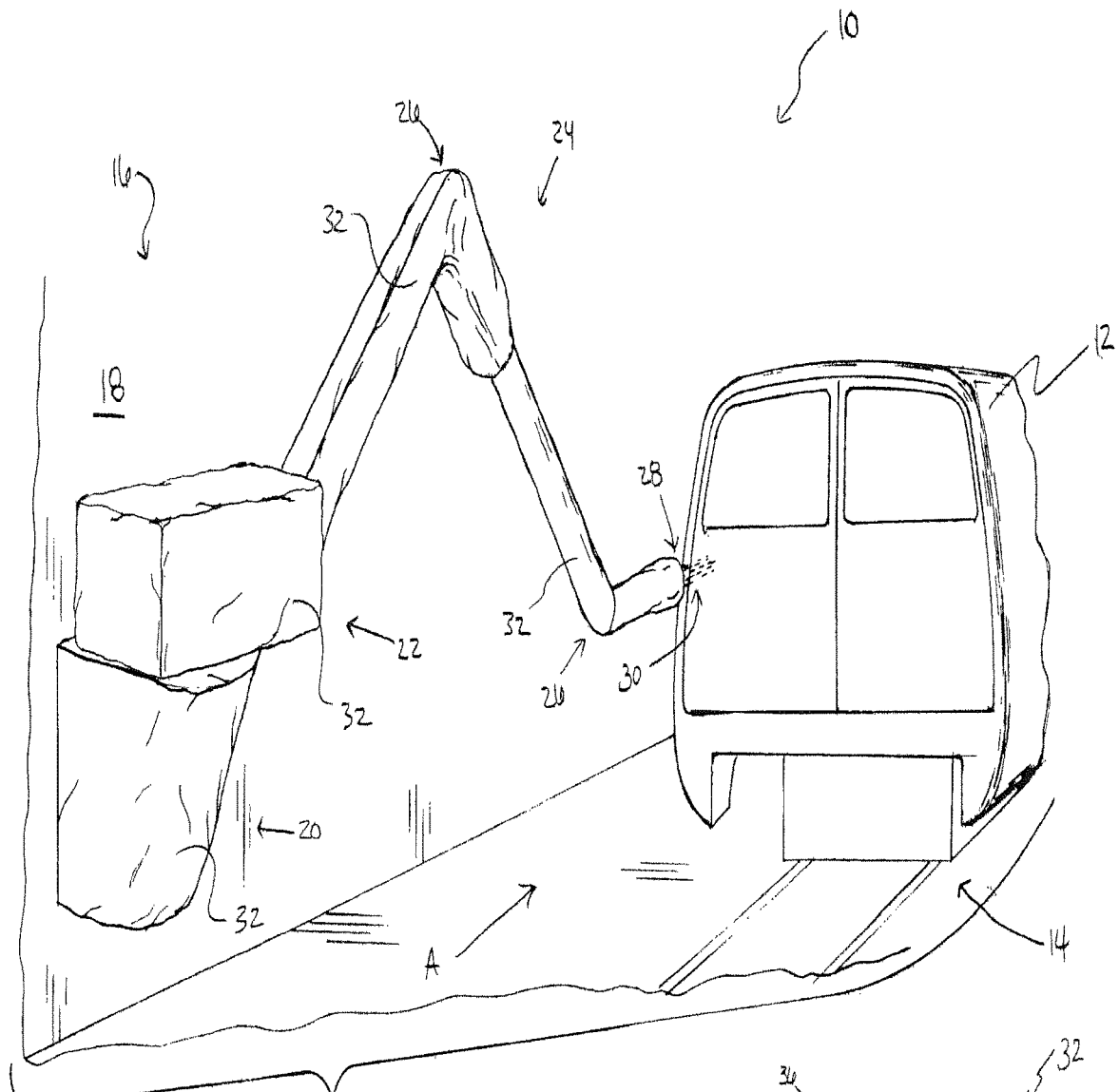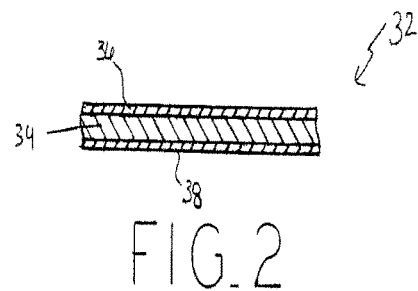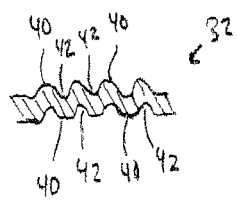

POLYMERIC COVER FOR ROBOTS

CROSS-REFERENCE TO RELATED APPLICATION

This application is a continuation application of U.S. patent application Ser. No. 11/691,828, filed Mar. 27, 2007.

INCORPORATION BY REFERENCE

The disclosure of U.S. patent application Ser. No. 11/691,828, which was filed on Mar. 27, 2007, is hereby incorporated by reference for all purposes as if presented herein in their entirety.

FIELD OF THE INVENTION

The present invention relates to covers for robots, and, particularly, to covers for robots having spray nozzles.

DESCRIPTION OF THE RELATED ART

Robots are commonly used in various industrial applications to perform constant, repetitive tasks. For example, a robot may be placed on an assembly line to weld together or paint parts moving therealong. When painting a part moving along an assembly line, for example, a robot may spray the paint directly onto the moving part. This may result in a portion of the paint, which is atomized by the spraying, being emitted into the surrounding air without physically contacting the part, i.e., overspray. To help contain this atomized paint, a booth may be erected around the painting operation on the assembly line. The booth helps to contain the atomized paint and prevent the same from contacting other machinery located along or parts moving down the assembly line. As the atomized paint moves through the air within the paint booth, it may encounter other atomized paint, dust, or other debris. As a result, the various particles may adhere to one another and, ultimately, fall from the air. The combined particles may then land anywhere within the paint booth, such as on a freshly painted surface or a painting robot. Alternatively, the atomized paint may simply drift into an object, such as a painting robot, within the paint booth.

Over time, the continual contact of atomized paint with a painting robot may create enough paint layers to result in release of said paint from layers onto the painted surface. This may result in the need for additional maintenance work to remove the paint, such as stripping the paint from the robot. Additionally, when atomized paint combines with other particles, the contact of the combined particles with a freshly painted surface may require repainting that surface. To prevent the build up of paint on a painting robot and remove the atomized paint from the air of a paint booth, robot covers may be used. A robot cover surrounds the painting robot and prevents paint from accumulating on the surfaces thereof. Additionally, the cover may retain the paint thereon to prevent the atomized paint from continuing to travel through the painting booth.

SUMMARY

The present invention relates to robot covers and, particularly, to covers for robots having spray nozzles wherein the surface material of the covers have been enhanced for residue retention. The robot covers of the present invention may be formed from a polymer, which in one exemplary embodiment may be polyethylene. For example, the polymer may be received in the form of a cast or blown extruded plastic film. In one exemplary embodiment, the polymer may be processed to increase the surface energy and/or surface area of the polymer. For example, the polymer may be subjected to a corona treatment in order to increase its surface energy. Additionally, the polymer may be subjected to an embossing process in order to increase its surface area. In one exemplary embodiment, the polymer may be subjected to thermal molding to increase its surface energy and/or surface area. In another exemplary embodiment, the process used to increase the surface energy and/or surface area is performed on the polymer as received, prior to cutting or otherwise manipulating the polymer. In another exemplary embodiment, the process used to increase the surface energy and/or surface area is performed by the manufacturer or converter of the polymer prior to receipt of the polymer.

Once processed, the polymer may then be assembled into a robot cover. To assemble the polymer into a robot cover, the polymer may be cut into individual sections or subjected to tubular extrusion prior to assembly. Additionally, the individual sections and/or tubular extrusion may be further cut, perforated into rolls, or sealed together. In one exemplary embodiment, the polymer is then assembled by thermal sealing the sections together. Thermal sealing provides a bond between the individual sections of polymer that secures the individual sections together to create the robot cover. Additionally, during assembly, the sections may be sewn, stitched, glued, thermally molded, pressure molded, vacuum molded, blow molded, or subjected to sonic welding to secure the sections together. Further, the methods of increasing the surface energy and/or surface area of the present invention may be used to form drapes or curtains for a paint shop booth and/or wall and window covers, for example.

Advantageously, by increasing the surface energy of the polymer, such as by corona treating the surface of the polymer, the wettability and adhesivity of the polymer's surface is increased to enhance its ability to retain residue. As a result, fluids, including but not limited to paint, primer, clear coat, adhesives, coatings, and/or other depositions, contacting the robot cover of the present invention may be more readily retained thereon. This allows the atomized paint in a paint booth, for example, to be retained on the robot cover as it dries. Additionally, by increasing the surface area of the polymer, such as by embossing the polymer, the amount of paint capable of being retained thereon is increased. For example, by embossing the polymer a plurality of ridges and valleys may be created that increase the effective surface area of the polymer, Other embossing techniques, including but not limited to grit, diamond, or honeycomb shapes, may be used to increase the effective surface area of the robot cover. In turn, the increase in the effective surface area facilitates the dispersion of the paint over a larger area, increasing the ability of the polymer to retain paint thereon. As a result of increasing the surface energy and/or surface area of the polymer, the robot cover of the present invention provides a barrier between or a masking of a robot from the atomized paint of the painting booth.

Additionally, using an extruded, cast, molded or liquid polymer to manufacture robot covers is less expensive and mitigates against fibrous material, included but not limited to cotton, nonwovens, polyester or nylon knits or wovens being readily released as particles, i.e., lint, into a paint booth. The particles released from the fibrous material of a robot cover may encounter a freshly painted surface, potentially requiring that the surface be repainted or repaired.

Such polymer material may be easily formed into tubular sections or laminar sheets that easily accommodate manufacture into a robot cover, and alternatively polymer material may be molded via a thermal, pressure, vacuum, or blow molding process to be structured and arranged to envelop a robot, robot arm, robot axis, or other robot components. Moreover, by thermal sealing, sewing, stitching, gluing, and/or sonic welding the seams of a robot cover made from a polymer, the cost of manufacture and maintenance of the robot cover may be substantially decreased. Additionally, the lower material cost of the polymer allows the cover to be readily replaced without the need to rework or otherwise clean the cover, further decreasing the manufacturing costs, as well as associated maintenance costs.

In one form thereof, the present invention provides a cover configured for receipt on a spraying device of a robot, one embodiment of the spraying device being an arm having a spray gun with a spray nozzle for dispersing a fluid connected thereto, the cover including a first portion of flexible polymer structured and arranged to substantially surround at least a portion of the spraying device of the robot, the polymer having an outer surface, the outer surface having a surface area and a surface energy, wherein the polymer is processed to increase at least one of the surface energy and the surface area of the outer surface, whereby the increased at least one of the surface energy and the surface area of the outer surface facilitates the retention of fluid thereon.

In another form thereof, the present invention provides a combination including a robot having a base and a spraying device, in one embodiment the spraying device including an arm with a spray nozzle connected to the arm, the spray nozzle configured to disperse a fluid therefrom; and a cover having a first portion of flexible polymer structured and arranged to substantially surround at least a portion of the spraying device of the robot, the polymer having an outer surface, the outer surface having a surface area and a surface energy, wherein the polymer is processed to increase at least one of the surface energy and the surface area of the outer surface, whereby the increased at least one of the surface energy and the surface area of the outer surface facilitates the retention of fluid thereon.

In yet another form thereof, the present invention provides a method of covering a spraying device of a robot including providing a first portion of flexible polymer, the first portion of flexible polymer having an outer surface, the outer surface having a surface area and a surface energy; processing the first portion of flexible polymer to increase at least one of the surface energy and the surface area of the outer surface, whereby the increased at least one of the surface energy and the surface area of the outer surface facilitates the retention of fluid thereon; and forming the first portion of flexible polymer into a cover structured and arranged to substantially surround at least a portion of the spraying device of the robot.

BRIEF DESCRIPTION OF THE DRAWINGS

The above-mentioned and other features and advantages of this invention, and the manner of attaining them, will become more apparent and the invention itself will be better understood by reference to the following description of an embodiment of the invention taken in conjunction with the accompanying drawings, wherein:

FIG. 1 is a perspective view of a paint booth including a vehicle body traveling therethrough and a painting robot covered by a robot cover according to the present invention;

FIG. 2 is a fragmentary cross-sectional view of the robot cover of FIG. 1; and

FIG. 3 is a fragmentary cross-sectional view of another exemplary embodiment of the robot cover of FIG. 1.

Corresponding reference characters indicate corresponding parts throughout the several views. Although the drawings represent embodiments of the present invention, the drawings are not necessarily to scale and certain features may be exaggerated in order to better illustrate and explain the present invention. The exemplifications set out herein illustrate embodiments of the invention, in several forms, and such exemplifications are not to be construed as limiting the scope of the invention in any manner.

DETAILED DESCRIPTION

The embodiments disclosed below are not intended to be exhaustive or limit the invention to the precise form disclosed in the following detailed description. Rather, the embodiments are chosen and described so that others skilled in the art may utilize its teachings.

Referring to FIG. 1, paint booth 10 is shown including vehicle body 12 positioned on conveyor 14. Conveyor 14 moves vehicle body 12 along the assembly line to various assembly stations. Additionally, robot 16 is secured within paint booth 10 to wall 18. Robot 16 may be a flexible automation robot, i.e., a robot capable of articulation about a plurality of axes, or a hard automation robot, i.e., a robot that is generally stationary or capable of movement along only a single axis. Robot 16 is secured to wall 18 via base 20. Connected to base 20 of robot 16 is body 22 and arm 24. Body 22 may be actuated to rotate relative to base 20. Similarly, arm 24 may be actuated to move at pivots 26. The actuation of body 22 and arm 24 allows for robot 16 to assume numerous positions as vehicle body 12 moves through paint booth 10 on conveyor 14. At the end of arm 24 is a device for spraying fluid material, which in this exemplary embodiment comprises a spray gun with one or more spray nozzles 28, which provides an exit for pressurized paint therethrough. As the paint travels through spray nozzle 28 it is atomized and dispersed as paint 30. Atomized paint 30 leaving nozzle 28 is propelled toward vehicle body 12. While described herein as emitting atomized paint 30, robot 16 may be used in conjunction with any fluid. For example, robot 16 may be used to apply paint, primer, clear coat, adhesives, coatings, and/or depositions to an object.

During operation of conveyor 14, vehicle body 12 is moved in the direction of arrow A through paint booth 10. As vehicle body 12 moves through paint booth 10, robot 16 moves, as discussed above, via body 22 and pivots 26 of arm 24 to position spray nozzle 28 at various points along vehicle body 12. In this manner, the actuation of robot 16 and the cooperative movement of vehicle body 12 through paint booth 10 provide for the substantial entirety of vehicle body 12 to be coated with atomized paint 30. To protect robot 16 from atomized paint 30 which fails to contact vehicle body 12 during the painting operation, i.e., overspray, cover 32 may be placed over base 20, body 22, and arm 24 of robot 16. In alternative embodiments (not shown), cover 32 may be configured to envelop a spray gun or other spraying device, possibly operably connected to a robot, and thus protect that spraying mechanism from residue build up.

As depicted herein, cover 32 is assembled to form a one-piece, integral cover. In another exemplary embodiment, cover 32 may be divided into individual, distinct components, one component covering each of base 20, body 22, and arm 24, for example. Additionally, cover 32 may by sized larger than the individual components of robot 16 to facilitate the placement of cover 32 on robot 16. Further, to retain cover 32 in position on robot 16, cover 32 may include fasteners, such as elastic bands, tape, snaps, zippers, Velcro®, a continuously interlocking strip fastener, i.e., Ziploc®, and/or sliders. Velcro® and Ziploc® are registered trademarks of Velcro Industries, B.V. and S.C. Johnson & Son, Inc., respectively. Additionally, the fasteners may be independent of cover 32 and connected thereto after cover 32 is properly positioned on robot 16. To facilitate movement of the joints or articulating areas of robot 16, cover 32 may include portions having folds, pleats, gussets, or darts, for example. Alternatively, in another embodiment (not shown), the polymer may be provided in a sticky roll, sheet, or perforated sheet film version wherein pieces of the polymer material may simply be installed onto the robot or spraying equipment by sticking or placing such adhesive polymer directly or indirectly on the robot or spraying equipment surface.

As depicted in FIGS. 1 and 2, cover 32 substantially surrounds robot 16 to prevent atomized paint 30 from contacting robot 16. Additionally, cover 32 is formed from a flexible polymer, which allows robot 16 to move substantially unrestricted. Any flexible, extrudeable polymer capable of withstanding the manufacturing process described herein may be used to form cover 32. For example, low density polyethylene, linear low density polyethylene, polypropylene, polyurethane, polyester, polyether, nylon, polyvinyl chloride, polyvinyl acetate, polyvinyl alcohol, and any polymer or copolymer of the foregoing or any other combination thereof. In one exemplary embodiment, the polymer has been processed to increase the surface energy, i.e., dyne level, and/or the surface area thereof. In one exemplary embodiment, the polymer is subjected to corona treatment. The document "Corona Treatment: An Overview" by David A. Markgraf (Senior Vice President of Enercon Industries Corporation) discloses one example of a corona treatment, and the disclosure is expressly incorporated by reference herein (as submitted in the Information Disclosure Statement filed on even day herewith). The corona treatment increases the surface energy of the polymer, i.e., dyne levels of 32 to 68 have been achieved, correspondingly increasing the wettability and adhesivity of the polymer's surface. By increasing the surface energy of the polymer, atomized paint 30 will more readily be retained by and retained on cover 32.

Referring to FIG. 2, the fragmentary cross-section of cover 32 is shown depicting center region 34 and opposing outer surfaces 36, 38. In this embodiment, outer surfaces 36, 38 have both been processed to increase the surface tension of cover 32. Specifically, in this embodiment, outer surfaces 36, 38 have been subjected to corona treatment, in the form of a corona discharge. A corona discharge occurs when a current is developed at an electrode of high potential in a neutral fluid, such as air, resulting in the ionization of the surrounding fluid, which may then slowly diffuse to a second, grounded electrode. By moving cover 32 through the neutral medium, which now contains ionized particles, and over the grounded electrode, which may be in the form of a grounded roller, activation energy is transferred from the ionized particles to outer surfaces 36, 38 of the polymer. This may result in the breaking of polymeric chains forming polymer 32 and the creation of radicals. The chains and radicals will rapidly react with further particles or the environment, for example These reactions may form both polar and hydrogen bonds along outer surfaces 36, 38 which, resultantly, increase the surface energy of the polymer. Thus, the areas depicted in FIG. 2 as surfaces 36, 38 are areas of additional molecular bonding having a higher surface energy than the unprocessed polymer. In another exemplary embodiment, only one of outer surfaces 36, 38 are processed to increase the surface energy of the exposed surface of cover 32.

In another exemplary embodiment, shown in FIG. 3, cover 32 has been processed to increase the surface area thereof. In one embodiment, the polymer of cover 32 is subjected to an embossing process. The document "About The Technology of Embossing for Commercial Application" (from www.embossingtechnologies.com/technology.htm on Mar. 8, 2007) discloses one example of an embossing process, and the disclosure is expressly incorporated by reference herein (as submitted in the Information Disclosure Statement filed on even day herewith). By increasing the surface area of the polymer, the embossing process increases the amount of paint that may be retained by the polymer. Additionally, the embossing process increases the flexibility of the polymer. For example, the polymer may be subjected to a hot embossing process in which the polymer is heated to a temperature above its glass transition temperature and pressed in a mold. Sufficient force is exerted by the mold on the polymer to cause the polymer to take a shape corresponding to the exterior surface of the mold. Then, once the polymer cools, the polymer will retain the shape formed by the mold.

In another exemplary embodiment, the polymer may be subjected to a rotary embossing process. In a rotary embossing process, the polymer passes between two rollers. The rollers may both be engraved with patterns that engage one another as the polymer passes between the two rollers. Alternatively, only one of the rollers may be engraved. As the polymer passes between the rollers, the polymer encounters a pressure sufficient to force the polymer into the engraved portions of the roller. As a result, the polymer exiting the rollers has a raised pattern corresponding to the pattern of the engraving on the roller. For example, as shown in FIG. 3, the embossing process may create ridges 40 and grooves 42 in the polymer. In one exemplary embodiment, ridges 40 and grooves 42 may form a pattern, including but not limited to grit, natural grit, diamond, or honeycomb patterns. When paint contacts the polymer at one of ridges 40, the paint may fall into and be retained by an adjacent groove 42. Additionally, as grooves 42 become filled with paint, ridges 40 provide additional surface area upon which further amounts of paint may be retained.

The process of increasing the surface energy of the polymer may be performed in conjunction with the process of increasing the surface area of the polymer. For example, the polymer may be processed to increase its surface energy and subsequently processed to increase its surface area. Thus, in one exemplary embodiment, the polymer may be subjected to a corona treatment and then subjected to an embossing process. Alternatively, the polymer may be processed to increase its surface area and subsequently processed to increase its surface energy. Thus, in another exemplary embodiment, the polymer may be subjected to an embossing process and then subjected to a corona treatment. Moreover, in another exemplary embodiment, the process of increasing the surface energy of the polymer may be performed substantially concurrently with the process of increase the surface area of the polymer. In addition, other methods of increasing the attraction and adherence of paint and other residue may be applied to the polymer material of the cover, such as a coating of material which has such attraction and adherence properties.

To increase the surface energy and/or surface area of cover 32, individual sections of the polymer may be cut and individually subjected to processing, such as corona treatment and/or embossing, as described in detail above. By processing cover 32 as a flat layer of material, the difficulty of processing cover 32 may be decreased and the results of the processing may be improved. Alternatively, in another exemplary embodiment, cover 32 may be assembled in its entirety and subjected to processing to increase its surface energy and/or surface area. In yet another exemplary embodiment, the polymer may be treated as received, before any assembly occurs. For example, cover 32 may be formed from tubular plastic film which may be subjected to processing as received. In one exemplary embodiment, the tubular plastic film forming cover 32 may be tapered, easing the manufacture of cover 32.

To assemble cover 32, individual sections of polymer may be joined by heat or thermal sealing. In another embodiment, edges of a single section of polymer may be joined by thermal sealing to form a tubular shape, for example. To thermal seal individual sections of polymer together to form cover 32, the edges of the individual sections are slightly overlapped. Along the overlap, heat and, in some embodiments, pressure is applied to the overlapped sections of the individual sections of polymer. In one exemplary embodiment, the thermal sealing process is automated. As a result of the thermal sealing, the individual polymer sections are substantially permanently joined to form cover 32. Advantageously, the use of thermal sealing eliminates the cost of thread and also eliminates the need for labor to sew individual sections of cover 32 together, lowering the overall manufacturing costs. Additional sealing techniques, such as sonic welding, sound and/or pressure sealing, sewing, thermal molding, pressure molding, vacuum molding, blow molding, and/or gluing may also be used individually or in combination with thermal sealing to form cover 32. Further, by replacing cotton, polyester, or other fibrous material with a low cost polymer, the overall cost of cover 32 is substantially reduced. As a result, after cover 32 reaches the end of its useful life, cover 32 may be readily replaced, eliminating the need to reprocess, treat, or otherwise clean cover 32. Thus, when cover 32 is sufficiently saturated with wet or dry atomized paint 30 or otherwise becomes ineffective, cover 32 is removed from robot 16 and replaced by a new cover 32. Additionally, if cover 32 is formed from a water soluble material, for example polyvinyl alcohol, cover 32 may be placed in the paint wastewater for disposal.

Sections of cover 32 are shaped, structured and arranged to substantially surround at least a portion of arm 24 of robot 16. Cover 32 effectively shields robot 16 from atomized particulate by surrounding, enveloping, or otherwise blocking fluid flow from outside of cover 32 to robot 16. Such structure and arrangement may be accomplished from polymer created in a tubular form, or from laminar polymer sheets, or through a molding process, including but not limited to thermal, vacuum, blow, and pressure molding processes. As described above, such structure and arrangement may be accomplished through several suitable manufacturing processes.

In another exemplary embodiment, cover 32 is assembled with surfaces 36, 38 and center region 34 each being individual, distinct layers of polymer. In this embodiment, the layers forming surfaces 36, 38 are each subjected to processing, such as corona treatment and/or embossing, to increase their surface tension and/or surface area. These layers are then assembled on opposing sides of the polymer layer forming center region 34 by heat sealing, for example, which is described in detail above. In one exemplary embodiment, surfaces 36, 38 have a thickness which is less than the thickness of center region 34. This embodiment may be formed by using copolymers, such as copolymers formed from the polymers set forth herein.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of forming a cover for a section of a robot in a painting or coating booth; the section of the robot having a first end and a second end; the method comprising:
   providing a cover portion formed from a flexible polymer, the cover portion having an outer surface, the outer surface having a surface area and a surface energy;
   increasing the surface energy and the surface area of the outer surface, whereby the increased surface energy and the increased surface area of the outer surface facilitate retention of fluid on the outer surface, wherein the increasing of the surface energy of the outer surface comprises corona treating the outer surface;
   forming the cover portion into the cover; and covering the section of the robot with the cover;
   wherein the first end of the section of the robot is attached to another section of the robot at a first articulable axis.

2. The method of forming of claim 1 wherein the second end of the section of the robot is fixed.

3. The method of forming of claim 2 wherein the section of the robot is a base.

4. The method of forming of claim 1 wherein the second end of the section of the robot is attached to a wall in the painting or coating booth.

5. The method of forming of claim 1 wherein the second end of the section of the robot is a spray nozzle.

6. The method of forming of claim 1 wherein the increasing of the surface energy of the outer surface comprises increasing the wettability and adhesivity of the outer surface.

7. The method of forming of claim 1 wherein the covering of the section of the robot includes positioning the cover portion over substantially all of the section of the robot.

8. The method of forming of claim 1 further comprising:
   securing the cover portion to the robot.

9. The method of forming of claim 1 further comprising:
   providing at least one other cover portion formed from a flexible polymer; and
   securing the at least one other cover portion to the cover portion.

10. The method of forming of claim 9 wherein the securing of the at least one other cover portion to the cover portion comprises extruding, thermally sealing, sonic welding, sound sealing, pressure sealing, sewing, thermal molding, pressure molding, vacuum molding, blow molding, or gluing.

11. The method of forming of claim 1 wherein the forming of the cover portion includes extruding, thermally sealing, sonic welding, sound sealing, pressure sealing, sewing, thermal molding, pressure molding, vacuum molding, blow molding, or gluing together at least the cover portion to itself or to at least one other cover portion formed from a flexible polymer.

12. The method of forming of claim 1 further including:
providing a fastener for attaching the cover portion to itself or to at least one other cover portion formed from a flexible polymer.

13. The method of forming of claim 12 wherein the fastener comprises at least one of elastic bands, tape, snaps, zippers, Velcro®, a continuously interlocking strip fastener, or sliders.

14. The method of claim 1 wherein the increasing of the surface area of the outer surface comprises creating ridges and valleys on the outer surface.

15. The method of forming of claim 14 wherein the ridges and valleys are formed by embossing or thermal molding the outer surface.

16. A method of forming a cover for a section of a robot in a painting or coating booth; the section of the robot having a first end and a second end; the method comprising:
providing a cover portion formed from a flexible polymer, the cover portion having an outer surface, the outer surface having a surface area and a surface energy;
increasing the surface energy and the surface area of the outer surface, whereby the increased surface energy and the increased surface area of the outer surface facilitate retention of fluid on the outer surface, wherein the increasing of the surface energy of the outer surface comprises corona treating the outer surface;
forming the cover portion into the cover; and covering the section of the robot with the cover;
wherein the first end of the section of the robot is attached to a first other section of the robot at a first articulable axis and wherein the second end of the section of the robot is attached to a second other section of the robot at a second articulable axis.

17. The method of forming of claim 16 wherein the section is an arm of the robot.

18. The method of forming of claim 16 wherein the section of the robot comprises a body section, inner arm, outer arm, or wrist section of the robot.

19. The method of forming of claim 16 wherein the increasing of the surface energy of the outer surface comprises increasing the wettability and adhesivity of the outer surface.

20. The method of forming of claim 16 wherein the covering of the section of the robot includes positioning the cover portion over substantially all of the section of the robot.

21. The method of forming of claim 16 further comprising:
securing the cover portion to the robot.

22. The method of forming of claim 16 further comprising:
providing at least one other cover portion formed from a flexible polymer; and
securing the at least one other cover portion to the cover portion.

23. The method of forming of claim 22 wherein the securing of the at least one other cover portion to the cover portion comprises extruding, thermally sealing, sonic welding, sound sealing, pressure sealing, sewing, thermal molding, pressure molding, vacuum molding, blow molding, or gluing.

24. The method of forming of claim 16 wherein the forming of the cover portion includes extruding, thermally sealing, sonic welding, sound sealing, pressure sealing, sewing, thermal molding, pressure molding, vacuum molding, blow molding, or gluing together at least the cover portion to itself or to at least one other cover portion formed from a flexible polymer.

25. The method of forming of claim 16 further including:
providing a fastener to attach the cover portion to itself or to at least one other cover portion formed from a flexible polymer.

26. The method of forming of claim 25 wherein the fastener comprises at least one of elastic bands, tape, snaps, zippers, Velcro®, a continuously interlocking strip fastener, or sliders.

27. The method of forming of claim 16 wherein the increasing of the surface area of the outer surface comprises creating ridges and valleys on the outer surface.

28. The method of forming of claim 27 wherein the ridges and valleys are formed by embossing or thermal molding the outer surface.

29. A method of forming a replacement cover for a section of an item in a painting or coating booth; at least the section of the item being covered by a cover that was previously installed; the method comprising:
providing a cover portion formed from a flexible polymer, the cover portion being capable of being configured to substantially surround the section of the item, the first cover portion having an outer surface, the outer surface having a surface area and a surface energy;
increasing the surface energy and the surface area of the outer surface, whereby the increased surface energy and the increased surface area of the outer surface facilitate retention of fluid on the outer surface, wherein the increasing of the surface energy of the outer surface comprises corona treating the outer surface;
forming the cover portion into the replacement cover;
removing the cover that was previously installed from the section of the item; and mounting the replacement cover to cover substantially at least the section of the item, wherein the item is part of a robot.

30. The method of forming of claim 29 wherein the item is attached to a wall, floor, or ceiling in the painting or coating booth.

31. The method of forming of claim 29 wherein the item is movable.

32. The method of forming of claim 29 wherein the item is stationary.

33. The method of forming of claim 29 wherein the increasing of the surface energy of the outer surface further comprises increasing the wettability and adhesivity of the outer surface.

34. The method of forming of claim 29 further comprising:
securing the cover portion to the item.

35. The method of forming of claim 29 further comprising:
overlapping and securing the cover portion to at least a part of itself.

36. The method of forming of claim 29 further comprising:
providing at least one other cover portion formed from a flexible polymer; and
securing the at least one other cover portion to the cover portion.

37. The method of forming of claim 36 wherein the securing of the at least one other cover portion to the cover portion comprises extruding, thermally sealing, sonic welding, sound sealing, pressure sealing, sewing, thermal molding, pressure molding, vacuum molding, blow molding, or gluing.

38. The method of forming of claim 29 wherein the forming of the cover portion includes extruding, thermally sealing, sonic welding, sound sealing, pressure sealing, sewing, thermal molding, pressure molding, vacuum molding, blow molding, or gluing together at least the cover portion to itself or to at least one other cover portion formed from a flexible polymer.

39. The method of forming of claim 29 further including:
providing a fastener to attach the cover portion to itself or to at least one other cover portion formed from a flexible polymer.

40. The method of forming of claim 39 wherein the fastener is one of elastic bands, tape, snaps, zippers, Velcro®, a continuously interlocking strip fastener, or sliders.

41. The method of forming of claim 29 wherein the increasing of the surface area of the outer surface comprises creating ridges and valleys on the outer surface.

42. The method of forming of claim 41 wherein the ridges and valleys are formed by embossing or thermal molding the outer surface.

43. A method of forming a cover for at least one part of a flexible automation robot for a painting or coating booth, the method comprising:
providing a cover portion at least partially formed from a flexible polymer and comprising an outer surface, the outer surface of the cover portion comprising a surface area and a surface energy;
increasing the surface energy of the outer surface of the cover portion, wherein the increasing of the surface energy of the outer surface comprises corona treating the outer surface;
modifying the flexible polymer of the cover portion to include one or more grooves and one or more ridges on the outer surface of the cover portion to increase the surface area of the outer surface of the cover portion, wherein the increased surface area of the outer surface of the cover portion and the increased surface energy of the outer surface of the cover portion facilitate retention of fluid onto the outer surface of the cover portion;
forming the cover portion into the cover; and
covering the at least one part of the robot with the cover.

* * * * *